United States Patent [19]

Yamada et al.

[11] Patent Number: 4,987,450
[45] Date of Patent: Jan. 22, 1991

[54] ELECTROPHOTOGRAPHIC PRINTER COMPRISING ALIGNED PLURAL LIGHT EMITTING DEVICES

[75] Inventors: Osamu Yamada; Masayuki Mino, both of Osaka, Japan

[73] Assignee: Minolta Camera Kabushiki Kaisha, Osaka, Japan

[21] Appl. No.: 493,449

[22] Filed: Mar. 14, 1990

[30] Foreign Application Priority Data

Mar. 15, 1989 [JP] Japan .................................. 1-63297

[51] Int. Cl.⁵ ............................................ G03G 15/04
[52] U.S. Cl. ........................................ 355/228; 355/1; 358/401; 358/447
[58] Field of Search ................... 355/228, 1, 233, 210; 358/401, 447, 463

[56] References Cited

U.S. PATENT DOCUMENTS

| | | | |
|---|---|---|---|
| 4,435,064 | 3/1984 | Tsukada et al. | 355/1 |
| 4,699,497 | 10/1987 | Hinton et al. | 355/228 |
| 4,707,122 | 11/1987 | Lama et al. | 355/233 X |
| 4,743,089 | 5/1988 | Sakakibara et al. | 355/1 X |
| 4,860,116 | 8/1989 | Nakajima | 358/447 |
| 4,900,130 | 2/1990 | Haas | 355/1 X |

FOREIGN PATENT DOCUMENTS

56-26875  2/1982  Japan .

Primary Examiner—A. T. Grimley
Assistant Examiner—Sandra L. Hoffman
Attorney, Agent, or Firm—Burns, Doane, Swecker & Mathis

[57] ABSTRACT

There is disclosed an electrophotographic printer for projecting light from light source emitted according to image data onto a photoconductive body performing a mechanical scan operation in a subscan direction so as to form an image of the image data thereon, and for printing the image on a piece of printing paper using the electrophotographic process. In the electrophotographic printer, the light source comprises plural light emitting devices such as LEDs aligned in a main scan direction perpendicular to the subscan direction, and each light emitting device has a light output opening elongated in the subscan direction. Image data received from an external unit are once stored in an image memory, and the image data read therefrom are Fourier transformed. Thereafter, the Fourier transformed data are multiplied by a predetermined frequency characteristic defined by the shape of each light output opening, and data of the obtained product are Fourier inverse transformed as the image data to be printed, thereby improving a deterioration of the quality of said printed image caused when said light output opening is used.

11 Claims, 5 Drawing Sheets

ELECTROPHOTOGRAPHIC PRINTER COMPRISING ALIGNED PLURAL LIGHT EMITTING DEVICES

BACKGROUND OF THE INVENTION

1. FIELD OF THE INVENTION

The present invention relates to an electrophotographic printer comprising plural light emitting devices, and a method for processing an image signal in an electrophotographic printer comprising plural light emitting devices, more particularly, to an electrophotographic printer comprising plural light emitting devices each of which has a light output opening elongated in a sub scan direction perpendicular to a main scan direction, and a method for processing an image signal therein.

2. DESCRIPTION OF THE RELATED ART

In a conventional printer utilizing the electrophotographic process, after a photoconductive drum is electrified uniformly, it is exposed to light of image data so as to form an electrostatic latent image thereon. As light source means for exposing the photoconductive drum to light thereof, there have been used aligned light emitting diodes (referred to as LEDs hereinafter) of an linear LED array which are driven according to image data so as to project emitting light through each light output openings thereof onto the photoconductive drum, or light source system for selectively projecting light emitted from a light source such as a halogen lamp, a fluorescent lamp onto the photoconductive drum utilizing a linear liquid crystal shutter. It is to be noted that the light emitted through each light output opening from the light source is projected onto the photoconductive drum through an optical system such as a cell fox lens, a rod lens. The above electrostatic latent image is developed with toner so as to form a visible toner image on the photoconductive drum, and the visible toner image is transferred onto a piece of printing paper. Thereafter, the visible toner image is fixed thereon, resulting in a printed image of a document on the printing paper.

In the conventional light sources of this type, such as the linear LED array, the aforementioned light source system comprising the linear liquid crystal shutter, plural light output openings for outputting light of each emitting device such as an LED or each shutter device are aligned in a longitudinal direction of the printing line or in a main scan direction, and each light output opening has a shape of almost square.

Figure 1:
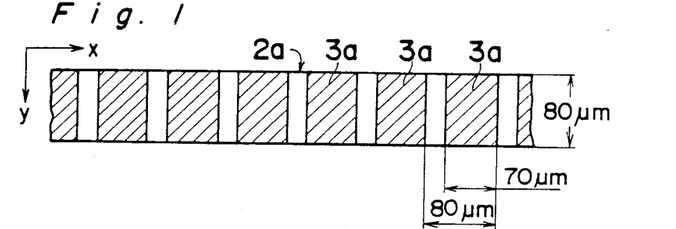
FIG. 1 is a schematic top plan view showing plural light output openings of LEDs of a conventional linear LED array which is used as a comparative example.

FIG. 1 shows an example of a linear LED array 2a comprising plural light output openings 3a of LEDs which are aligned in the main scan direction at a pitch of 80 $\mu$ms in a high density of 300 dots/inch, wherein each light output opening 3a has a longitudinal length of 80 $\mu$ms in the subscan direction corresponding to the y-axis direction which is perpendicular to the main scan direction corresponding to the x-axis direction, and a width of 70 $\mu$ms in the main scan direction. It is to be noted that the width of each light output opening 3a in the main scan direction is smaller than the length thereof in the subscan direction since plural LEDs are arrayed.

If each light output opening 3a is elongated in the subscan direction, the light amount of light emitted from each LED can be increased without decreasing the image density in the main scan direction. Therefore, when the aforementioned linear LED array 3a is used, the power consumption thereof can be decreased, and also the life of each LED thereof can be extended.

Further, when there is used the aforementioned light source system comprising the linear liquid crystal display shutter, the illumination intensity of the light source such as a halogen lamp, a fluorescent lamp can be set at a relatively smaller value, resulting in improvement of the illumination efficiency.

However, only when each light output opening 3a is elongated in the subscan direction, the quality of the printed image such as the contrast thereof, the definition thereof deteriorates.

SUMMARY OF THE INVENTION

An essential object of the present invention is to provide to an electrophotographic printer comprising plural light emitting devices aligned in the main scan direction, each device having a light output opening elongated in the subscan direction, which is capable of increasing the light amount of light emitted through each light output opening from each emitting device without lowering the quality of a printed image.

Another object of the present invention is to provide a method for processing an image signal in an electrophotographic printer comprising plural light emitting devices aligned in the main scan direction, each device having a light output opening elongated in the subscan direction, which is capable of increasing the light amount of light emitted through each light output opening from each emitting device without lowering the quality of a printed image.

In order to accomplish the above objects, according to one aspect of the present invention, there is provided an electrophotographic printer for projecting light emitted according to image data onto a photoconductive body performing a mechanical scan operation in a subscan direction so as to form an image of said image data on said photoconductive body, and for printing said image on a piece of printing paper using the electrophotographic process, comprising:

light emitting means comprising plural light emitting devices aligned in a main scan direction perpendicular to the subscan direction, each light emitting device having a light output opening elongated in the subscan direction;

storage means for storing first image data having been received from an external unit;

means for reading out said first image data from said storage means;

means for Fourier transforming said image data read out from said storage means into second image data;

means for multiplying said second image data by a predetermined frequency characteristic defined by the shape of each of said light output openings, thereby generating third image data;

means for Fourier inverse transforming said third image data into fourth image data; and means for controlling said light emitting means based on said fourth image data.

According to another aspect of the present invention, in a printer for converting an electric image signal into a light image signal using light emitting means comprising plural emitting devices aligned in a main scan direction, each device having a light output opening elongated in a subscan direction perpendicular to the main scan direction, and for projecting said light image signal onto a photoconductive body so as to form an image thereof, there is provided a method for processing an image signal comprising steps of:

Fourier transforming a primary electric image signal;

multiplying the value obtained by Fourier transforming by a predetermined frequency characteristic defined by the shape of each of said light output opening;

generating a secondary electric image signal by Fourier inverse transforming said obtained product; and converting said secondary electric image signal into a light image signal using said light emitting means so as to form an image of said light image signal on said photoconductive body, thereby improving a deterioration of the quality of said printed image caused when said light output opening is used.

According to a further aspect of the present invention, in a printer for converting an electric image signal into a light image signal using light emitting means comprising plural emitting devices aligned in a main scan direction, each device having a light output opening elongated in a subscan direction perpendicular to the main scan direction, and for projecting said light image signal onto a photoconductive body so as to form an image thereof, there is provided a method for processing an image signal comprising:

a first step of storing a primary electric image signal corresponding to image of one page in a memory;

a second step of reading out a primary electric image signal by one printing line from said memory;

a third step of Fourier transforming said read primary electric image signal;

a fourth step of multiplying the value obtained by Fourier transforming by a predetermined frequency characteristic defined by the shape of each of said light output opening;

a fifth step of generating a secondary electric image signal by Fourier inverse transforming said obtained product;

a sixth step of converting said secondary electric image signal into a light image signal using said light emitting means so as to form an image of said light image signal on said photoconductive body; and a seventh step of repeating said second to sixth steps so as to form said image of one page on said photoconductive body, thereby improving a deterioration of the quality of said printed image caused when said light output opening is used.

BRIEF DESCRIPTION OF THE DRAWINGS

These and other objects and features of the present invention will become clear from the following description taken in conjunction with the preferred embodiment thereof with reference to the accompanying drawings, in which:

FIG. 7 is a graph showing a frequency characteristic $H(\omega)$ of the general system shown in FIG. 4a;

DETAILED DESCRIPTION OF THE PREFERRED EMBODIMENT

An electrophotographic LED printer of a preferred embodiment according to the present invention will be described below in an order of the following items with reference to the attached drawings.

Figure 2:
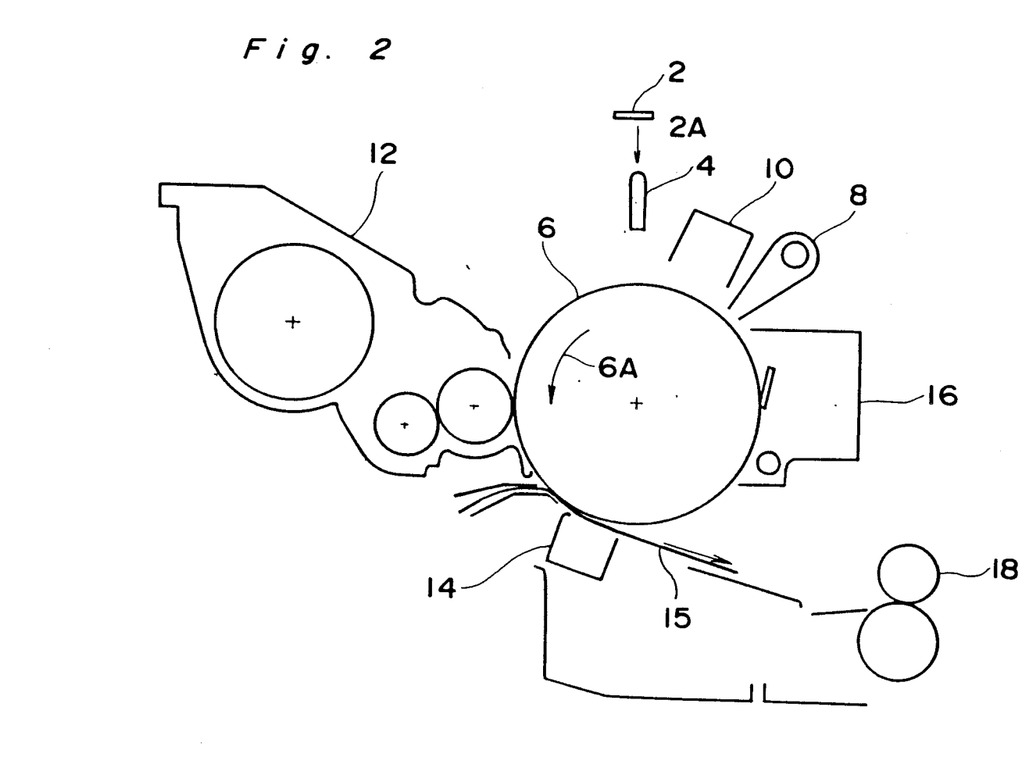
FIG. 2 is a schematic cross sectional view showing an electrophotographic LED printer of a preferred embodiment according to the present invention.
Figure 3:
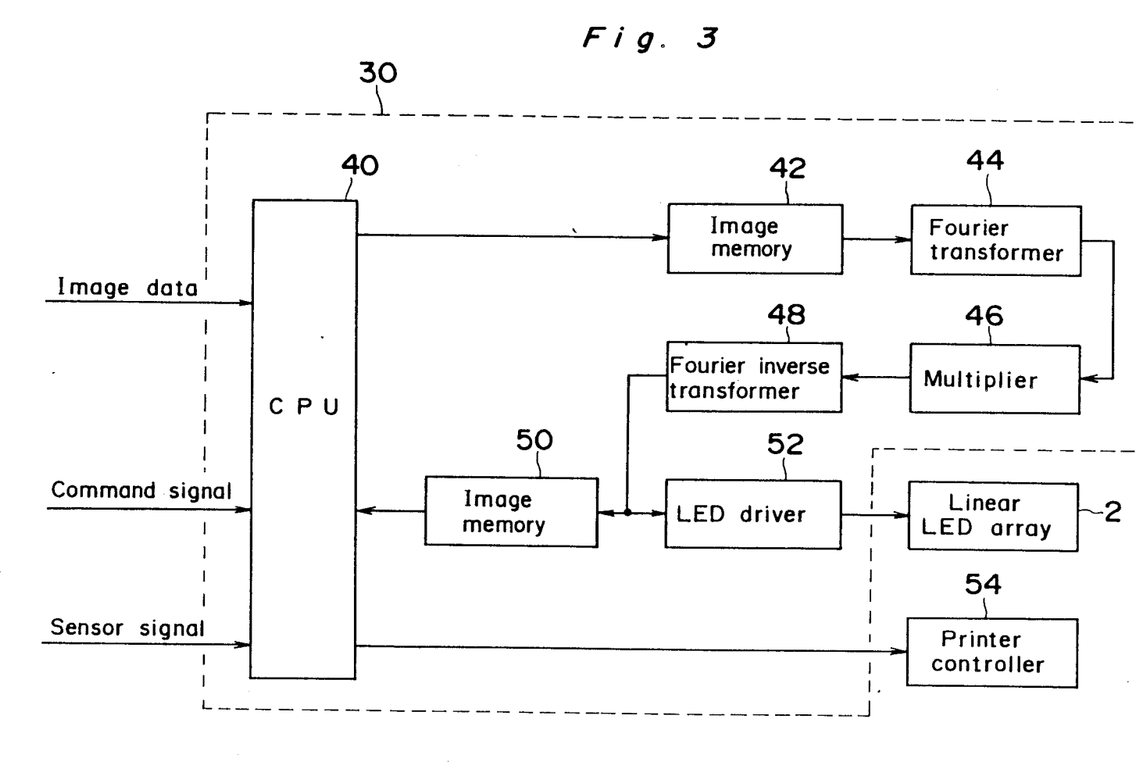
FIG. 3 is a block diagram showing a main controller for controlling action of the electrophotographic LED printer shown in FIG. 2.

(1) Composition of Electrophotographic LED printer
(2) Composition of Linear LED array
(3) Method for improving frequency characteristic
(4) Composition of Main controller
(5) Action of Main controller
(6) Modifications FIG. 2 shows the electrophotographic LED printer of the preferred embodiment according to the present invention, and FIG. 3 shows a main controller 30 of the electrophotographic LED printer shown in FIG. 2.

The electrophotographic LED printer is characterized in that there is used as a light source a linear LED array 2 comprising plural light output openings 3 each of which has a rectangular shape having a longitudinal length $l_b$ in the subscan direction as shown in FIG. 3, and a frequency characteristic upon printing image data is improved by the main controller 30 as described in detail later.

(1) Composition of Electrophotographic LED printer

Figure 5:
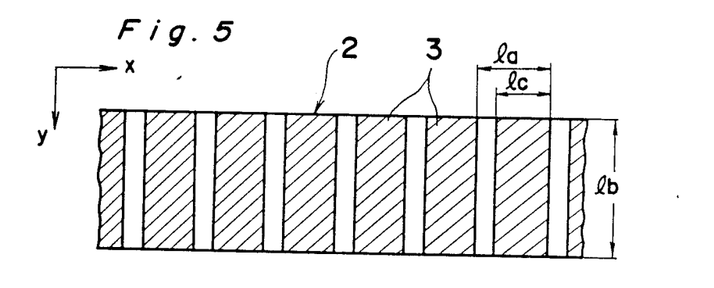
FIG. 5 is schematic top plan view showing plural light output openings of LEDs of a linear LED array shown in FIG. 2.

Referring to FIG. 2, each LED (not shown) of the linear LED array 2 emits through each light output opening 3 shown in FIG. 5 according to image data sent from an external unit such as an external host computer, so that a beam of light emitted therefrom is projected onto a surface of a photoconductive drum 6 through a cell fox lens array 4 in a direction as indicated by an arrow 2A. Around the photoconductive drum 6, there are provided in the counterclockwise direction an eraser lamp 8, a corona charger 10, a developing unit 12, a transfer charger 14, and a cleaner 16.

Upon printing image data, the photoconductive drum 6 is rotated in a rotation direction as indicated by an arrow 6A, and after light is projected onto the surface of the photoconductive drum 6 by the eraser lamp 8 so as to erase charge thereon, the surface of the photoconductive drum 6 is electrified uniformly by the corona charger 10. Then, when a beam of light emitted from the linear LED array 2 according to the image data is projected onto the surface of the photoconductive drum 6 so as to form an electrostatic latent image corresponding to an image of the image data thereon. Thereafter, the electrostatic latent image is developed with toner by the developing unit 12 so as to form a visible toner image thereon, and the visible toner image is transferred onto a piece of printing paper 15 by the transfer charger 14. Then, the toner remaining on the surface of the photoconductive drum 6 is removed by the cleaner 16. On the other hand, the printing paper is separated from the photoconductive drum 6, and the visible toner image transferred on the printing paper is fixed thereon by the fixing unit 18. Thereafter, the printing paper is discharged to an external paper tray (not shown).

(2) Composition of Linear LED array

FIG. 5 shows the light output openings 3 of respective LEDs of the linear LED array 2 shown in FIG. 2. In FIG. 5, the light output openings 3 are designated by the oblique lines.

Referring to FIG. 5, respective LEDs of the linear LED array 2 are aligned in the main scan direction (referred to as an x-axis direction hereinafter), and the light output openings 3 are formed opposing to the LEDs, respectively, so that a beam of light emitted from each LED is projected through each light output opening 3 and the cell fox lens array 4 onto the surface of the photoconductive drum 6, as shown in FIG. 2.

Each light output opening 3 has a width $l_c$ in the x-axis direction and a longitudinal length $l_b$ in the subscan direction (referred to as a y-axis direction hereinafter), and respective light output openings 3 are formed at a pitch of $l_a$ in the x-axis direction, namely, each light output opening 3 is formed apart from the adjacent light output opening 3 by a gap of $(l_a - l_c)$. Each light output opening 3 is elongated so that the longitudinal length lb in the y-axis direction is larger than the pitch $l_a$ in the x-axis direction in order to increase the light amount of light passing therethrough. It is to be noted that the width $l_c$ thereof in the x-axis direction is set so as to be smaller than the pitch $l_a$. In the preferred embodiment, the size of each light output opening 3 is set so that $l_a = 80$ μms, $l_b = 160$ μms, $l_c = 70$ μms, and $l_b/l_a = 2.0$.

In general, when the size of each light output opening 3 is elongated in the y-axis direction, the light amount of light passing therethrough increases. However, the quality of a printed image such as the contrast, the definition in the y-axis direction deteriorates. In order to overcome the above problems, the following calculation is executed in the preferred embodiment.

First of all, the response characteristic of each LED of the linear LED array 2 will be described below.

Figure 6:
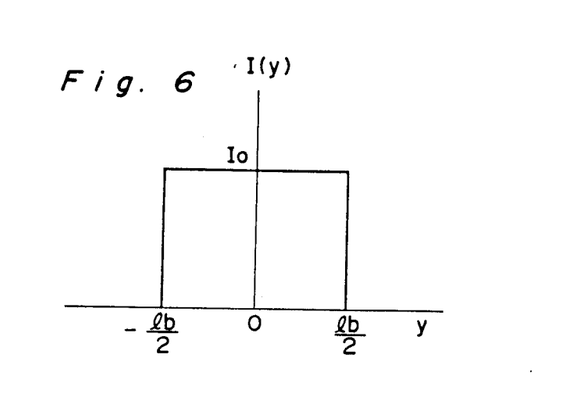
FIG. 6 is a graph showing an intensity distribution of a beam of light at the light output opening of each LED of the linear LED array shown in FIG. 5.

FIG. 6 shows a light density I(y) in the y-axis direction at the light output opening 3 of each LED of the linear LED array 2, and the light density I(y) is represented by the following equation with the y-axis set at the center of the light output opening 3 in the y-axis direction for convenience of the analysis:

$$I(y) = 0 \quad y < -\frac{l_b}{2}$$
$$= I_0 \quad \frac{l_b}{2} \geq y \geq -\frac{l_b}{2} \quad (1)$$
$$= 0 \quad y > \frac{l_b}{2}$$

Practically, each LED of the linear LED array 2 has an ununiform intensity distribution in the y-axis direction. Since it has been attempted to make the intensity distribution of the each LED uniform in the y-axis direction and also the ununiformity of the intensity distribution thereof does not almost influence the consideration of characteristics of each LED in the frequency domain, it is assumed in the specification that each LED of the linear LED array 2 has an uniform intensity distribution.

FIG. 1 shows plural light output openings 3a of each LED of the conventional linear LED array 2a of a comparative example, each light output opening 3a having a shape like almost square. In FIG. 1, the light output openings 3a are designated by the oblique lines.

(3) Method for improving frequency characteristic

In the rectangular light output opening 3 shown in FIG. 5 of the preferred embodiment, there is provided the same frequency characteristic as that of the light output opening 3a having the shape like almost square shown in FIG. 1 (referred to as an original frequency characteristic hereinafter), as described below.

First of all, the Fourier transformation theory and the Fourier inverse transformation theory with respect to a response characteristic of a general system 70 shown in FIG. 4a will be described below.

Figure 4A:
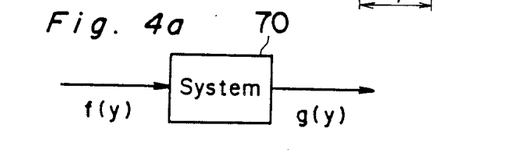
FIG. 4a is a block diagram showing a general system for explaining a response characteristic of the system.
Figure 4B:
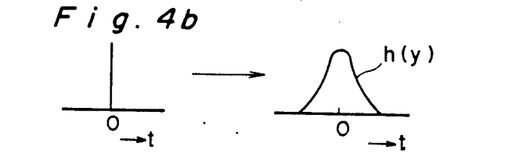
FIG. 4b is a waveform chart showing a waveform of an input signal inputted to the system shown in FIG. 4a and a waveform of an output signal outputted therefrom.

As shown in FIG. 4a, when a signal having a function f(y) is inputted to the system 70, it is assumed that a signal having a function g(y) is outputted therefrom. As an example, as shown in FIG. 4b, when a pulse signal having no width corresponding to a point light source is inputted to the system 70, it is assumed that a signal having a function h(y) is outputted therefrom. In this case, the function h(y) represents the characteristic of the transmission function of the system 70.

The frequency characteristics of these functions f(y), g(y) and h(y) are represented by the following equations with the Fourier transformation forms F(ω), G(ω) and H(ω) of the functions f(y), g(y) and h(y):

$$F(\omega) = \int_{-\infty}^{\infty} f(y) \cdot \exp(-i\omega y)\, dy \quad (2a)$$

$$G(\omega) = \int_{-\infty}^{\infty} g(y) \cdot \exp(-i\omega y)\, dy \quad (2b)$$

$$H(\omega) = \int_{-\infty}^{\infty} h(y) \exp(-i\omega y)\, dy \quad (2c)$$

The relationship among the frequency characteristics F(ω), G(ω) and H(ω) are represented by the following equation:

$$G(\omega) = F(\omega) \cdot H(\omega) \quad (3)$$

Namely, the frequency characteristic G(ω) of the output signal is the product of the frequency characteristic F(ω) of the input signal and the transmission function H(ω) of the system 70.

Simultaneously, the Fourier inverse transformation forms for transforming the frequency characteristics F(ω), G(ω) and H(ω) into the original functions f(y), g(y) and h(y) are represented as follows, respectively.

$$f(y) = \frac{1}{2\pi} \int_{-\infty}^{\infty} F(\omega) \cdot \exp(i\omega y)\, d\omega \quad (4a)$$

$$g(y) = \frac{1}{2\pi} \int_{-\infty}^{\infty} G(\omega) \cdot \exp(i\omega y)\, d\omega \quad (4b)$$

$$h(y) = \frac{1}{2\pi} \int_{-\infty}^{\infty} H(\omega) \cdot \exp(i\omega y)\, d\omega \quad (4c)$$

The general explanation of the functions f(y), g(y) and h(y) are described in, for example, Hiroshi KUBOTA, "Ohyoh Kohgaku (Applied Optics)", Iwanami Zensho, 1970, pp211.

Referring back to the comparison between the frequency characteristics of the printed image formed using each light output opening 3 of the LED of the linear LED array 2 of the preferred embodiment and the printed image formed using each light output opening 3a of the LED of the linear LED array 2a of the comparative example, when the aforementioned general theory is applied thereto, the light intensity I(y) of the LED at the light output opening 3 shown in FIG. 6 corresponds to the function h(y) of the signal outputted from the system 70. Therefore, the Fourier transformation of the light intensity I(y) leads to the following function $H(\omega)$ representing the frequency characteristic of the system.

$$H(\omega) = \frac{\sin \pi\omega}{\pi\omega} \tag{5}$$

where
an angular frequency $\omega = l_b \cdot N$,
$l_b$ is the longitudinal length [mm] of the light output opening 3, and
N is a spatial frequency [line/mm] which corresponding to the scan frequency in the y-axis direction in the electrophotographic LED printer.

Figure 7:
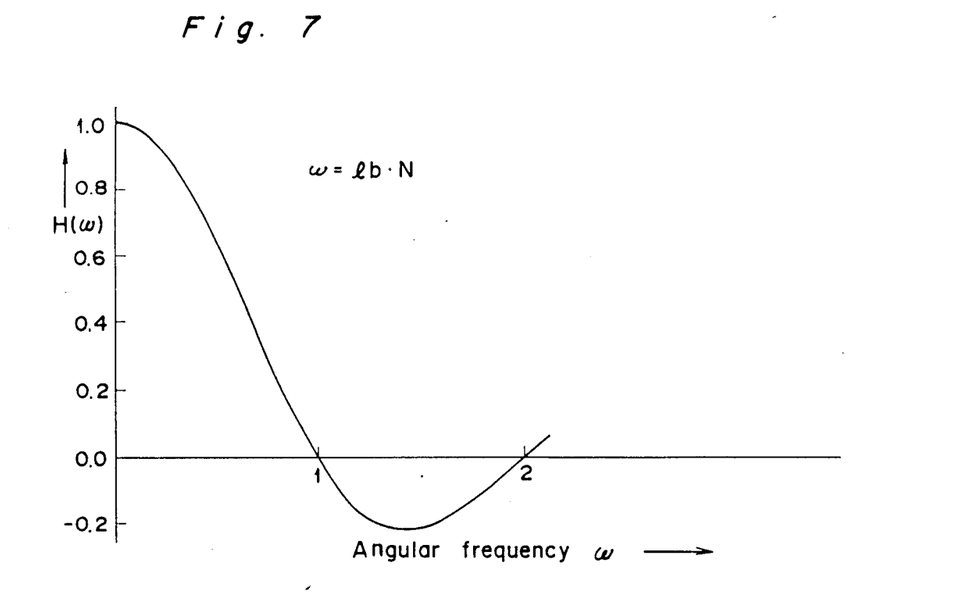

FIG. 7 shows the frequency characteristic of the function $H(\omega)$. Referring to FIG. 7, it is understood that the contrast of the printed image is lowered at a higher frequency or in a minute partial image thereof.

The function $H(\omega)$ of the preferred embodiment and the comparative example will be described below concretely in the case of a practical spatial frequency N in the y-axis direction.

Figure 8:
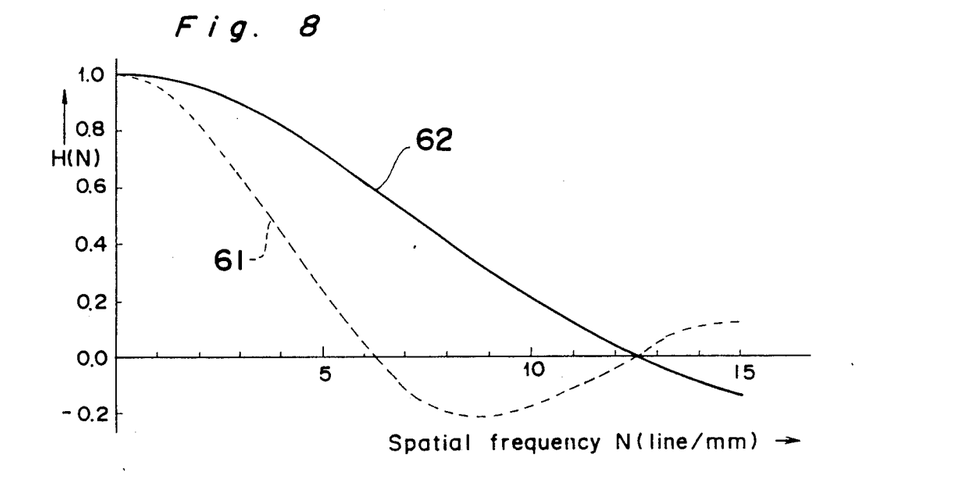
FIG. 8 is a graph showing a frequency characteristic $H(N)$ on a spatial frequency in the case of linear LED arrays of the preferred embodiment shown in FIG. 5 and the comparative example shown in FIG. 1.

FIG. 8 shows the frequency characteristics of the function H(N) on the spatial frequency N, wherein the dotted line curve 61 of FIG. 8 shows the frequency characteristic H(N) thereof in the case of the light output opening 3 of each LED of the linear LED array 2 of the preferred embodiment shown in FIG. 5, and the real line curve 62 of FIG. 8 shows the frequency characteristic H(N) thereof in the case of the light output opening 3a of each LED of the linear LED array 2a of the comparative example shown in FIG. 1.

When $\omega = l_b N = 1$, the function H(N) becomes L zero. At that time, the spatial frequency N is 6.25 lines/mm in the case of $l_b = 160$ μms of the preferred embodiment. On the other hand, the spatial frequency N is 12.5 lines/mm in the case of $l_b = 80$ μms of the comparative example, corresponding to 317.5 dots/inch.

Since the longitudinal length $l_b$ of the light output opening 3 of the preferred embodiment is twice that of the light output opening 3a of the comparative example, the value of the function H(N) of the preferred embodiment is the product of the value of cos(0.25N) and the value of the function H(N) of the comparative example. Therefore, the characteristic curve 62 is obtained by multiplying the characteristic curve 61 by the reciprocal 1/cos(0.25N). As a result, even though the longitudinal length $l_b$ is increased, the original characteristic curve can be obtained.

In the preferred embodiment, the function f(y) of the input signal is calculated from the function g(y) of the output signal, using the function $H(\omega)$ representing the frequency characteristic of the system 70. Then, the frequency characteristic lowered by elongating the light output opening 3 in the subscan direction can be improved so as to recover it into the aforementioned original frequency characteristic. In order to improve the lowered frequency characteristic, the following equation is used.

$$G(\omega) \times \frac{1}{H(\omega)} = F(\omega) \cdot H(\omega) \cdot \frac{1}{H(\omega)} = F(\omega) \tag{6}$$

Namely, the frequency characteristic $G(\omega)$ is calculated by the Fourier transformation of the function g(y) of the output signal as shown in the equation (2b), and then, the frequency characteristic $F(\omega)$ is calculated by multiplying the frequency characteristic $G(\omega)$ by the reciprocal of the frequency characteristic $H(\omega)$ as shown in the equation (6). Thereafter, the function f(y) of the original image data can be calculated by Fourier inverse transforming the frequency characteristic $F(\omega)$.

When the reciprocal $1/H(\omega)$ becomes infinity such as the case of a spatial frequency of 6.25 lines/mm as shown in FIG. 8, a suitable maximum value can be used as the reciprocal in the preferred embodiment.

(4) Composition of Main controller

Referring to FIG. 3, the main controller 30 comprises a CPU 40 for controlling an image printing process utilizing the aforementioned method for improving the frequency characteristic according to image data and a command signal which are inputted from an external unit such as an external host computer, and for controlling an action of the electrophotographic LED printer through a printer controller 54 according to the aforementioned command signal and sensor signals which are inputted from various kinds of sensors provided in the electrophotographic LED printer shown in FIG. 2. It is to be noted that the control operation of the main controller 30 through the printer controller 54 is similar to that of the conventional electrophotographic printer or a conventional copying machine, and therefore, the description thereof is omitted therein.

The main controller 30 further comprises an image memory 42 of a RAM for storing image data of one page outputted from the CPU 40, a Fourier transformer 44 for executing the Fourier transformation for image data of one printing line outputted from the image memory 42, a multiplier 46 for multiplying data outputted from the Fourier transformer 44 by the reciprocal $1/H(\omega)$ of the transmission function of the system, a Fourier inverse transformer 48 for executing the Fourier inverse transformation for data outputted from the multiplier 46, an image memory 50 of a RAM for storing image data of one printing line outputted from the Fourier inverse transformer 48, and an LED driver 52 for driving respective LED of the linear LED array 2 according to the image data outputted from the Fourier inverse transformer 48.

(5) Action of Main controller

Figure 9:
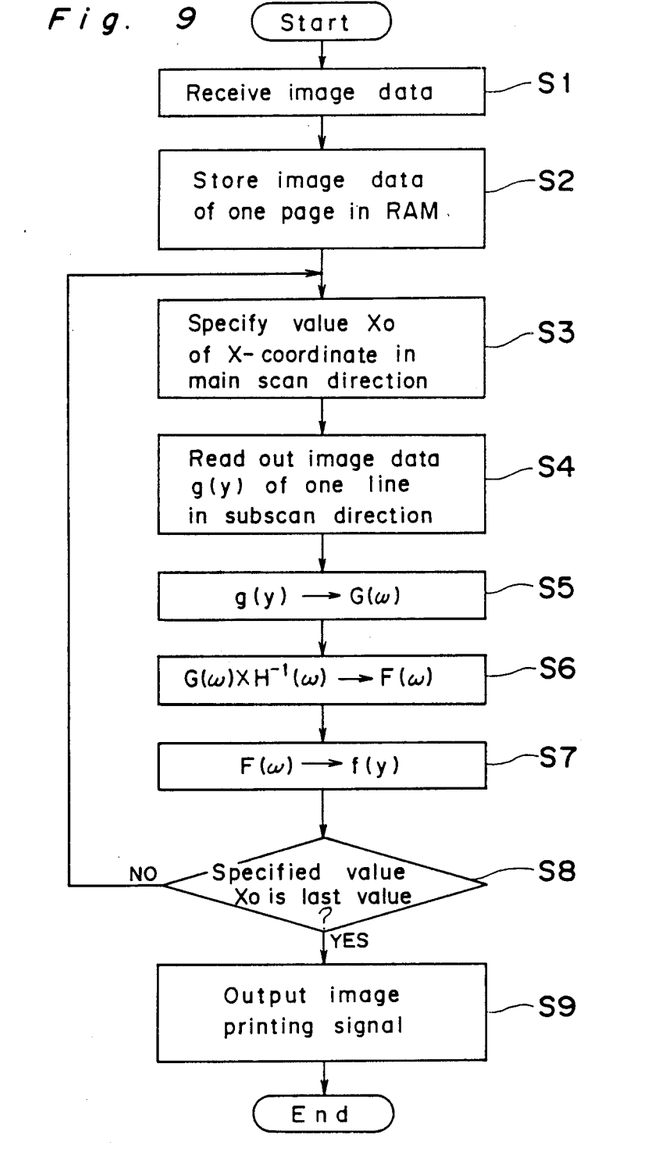
FIG. 9 is a flowchart showing a control flow of the main controller shown in FIG. 3.

An action of the main controller 30 will be described below with reference to FIGS. 3 and 9 showing a control flow thereof.

Referring to FIGS. 3 and 9, the CPU 40 receives image data and the commend signal sent from an external unit such as an external host computer at step S1, and stores the image data of two dimension information of one page in the image memory 42 at step S2.

When the image data of one page have been stored in the image memory 42, the Fourier transformation is executed as follows in order to improve the aforementioned deterioration of the quality of the printed image due to the elongation of the light output opening 3 in the y-axis direction.

First of all, the CPU 40 specifies a value $x_0$ of x-coordinate in the x-axis direction at step S3, and the image data of specified one line in the y-axis direction corresponding to the function g(y) (referred to as image data g(y) hereinafter) are read out from the image memory 42 at step S4. Thereafter, the Fourier transformer 44 calculates the Fourier transformation of the image data g(y) according to the equation (2b) so as to obtain the frequency characteristic $G(\omega)$ at step S5.

Thereafter, the multiplier 46 multiplies the frequency characteristic $G(\omega)$ by the reciprocal $1/H(\omega)$ of the frequency characteristic in the y-axis direction of each light output opening 3 so as to obtain the function $F(\omega)$ at all the frequencies at step S6. It is to be noted that the reciprocal $1/H(\omega)$ of the frequency characteristic can be obtained according to the equation (6) by giving the longitudinal length $l_b$ in the y-axis direction of the light output opening 3 of each LED of the linear LED array 2 and the scan frequency N in the x-axis direction.

Thereafter, when the Fourier inverse transformer 48 receives the data of the function $F(\omega)$ from the multiplier 46 at all the frequencies, the Fourier inverse transformer 48 calculates the Fourier inverse transformation of the function $F(\omega)$ so as to obtain the image data f(y) at step S7, and outputs the image data f(y) to the image memory 50 so as to store them therein.

Thereafter, it is judged whether or not the specified value $x_0$ of x-coordinate in the x-axis direction is the last value of the page at step S8. If the specified value $x_0$ is not the last value of the page (No at step S8), the program flow goes back to step S3, and then, the process from step S3 to step S7 is repeated for the next value $x_0$ again. On the other hand, if the specified value $x_0$ is the last value of the page (Yes at step S8), or the process of one page has been completed so as to calculate and store the printing image data of one page in the image memory 50, the program flow goes to step S9, and then, the printing image data of one page are read out from the image memory 50, and are outputted to the linear LED array 2 through the LED driver 52 at step S9 so as to drive the linear LED array 2 according to the printing image data. Then, the calculation process of the image data of one page has been completed.

In the preferred embodiment, the multiplication of reciprocal $1/H(\omega)$ of the frequency characteristic can improve the frequency characteristic of the printed image so as to recover it into the same frequency characteristic as that in the case of the light output openings 3a of the LED of the linear LED array 2a having the shape like almost square as shown in FIG. 1.

(6) Modifications

In the present preferred embodiment, the reciprocal $1/H(\omega)$ of the frequency characteristic $H(\omega)$ is calculated according to the equation (6) by giving the longitudinal length $l_b$ in the y-axis direction of the light output opening 3 of each LED of the linear LED array 2 and the scan frequency N in the x-axis direction. However, the present invention is not limited to this. As the multiplier of the multiplication, there may be used a suitable approximate function for increasing the values of the frequency characteristic at a higher frequency. It is to be noted that the aforementioned approximate function is defined by the shape of each light output opening of a light source and the spatial frequency or the scan frequency in the subscan direction.

Further, when the light output opening 3 of each LED of the linear LED array 2 has not a rectangular shape, there is calculated the frequency characteristic of the response corresponding to the shape of a light output opening of each LED of the linear LED array 2 as known to those skilled in the art, and the aforementioned calculation process can be executed similarly.

In the preferred embodiment, there are provided two image memories 42 and 50 for convenience of description. Practically, there may be provided one image memory for storing image data of at least one page in order to the aforementioned calculation process.

In the present preferred embodiment, there are used the linear LED array 2 composed of aligned plural LEDs. However, the present invention is not limited to this. There may be used various kinds of light sources having light output openings aligned in the x-axis direction or in the main scan direction, such as a halogen lamp, a fluorescent lamp, which are comprises a linear liquid crystal display shutter.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An electrophotographic printer for projecting light emitted according to image data onto a photoconductive body performing a mechanical scan operation in a subscan direction so as to form an image of said image data on said photoconductive body, and for printing said image on a piece of printing paper using the electrophotographic process, comprising:

light emitting means comprising plural light emitting devices aligned in a main scan direction perpendicular to the subscan direction, each light emitting device having a light output opening elongated in the subscan direction;

storage means for storing first image data having been received from an external unit;

means for reading out said first image data from said storage means;

means for Fourier transforming said image data read out from said storage means into second image data;

means for multiplying said second image data by a predetermined frequency characteristic defined by the shape of each of said light output openings, thereby generating third image data;

means for Fourier inverse transforming said third image data into fourth image data; and means for controlling said light emitting means based on said fourth image data.

2. The printer as claimed in claim 1,
    wherein said light emitting device is a light emitting diode.

3. The printer as claimed in claim 1,
    wherein said predetermined frequency characteristic is a reciprocal of a frequency characteristic of an image defined by the shape of each of said light output opening.

4. The printer as claimed in claim 1, wherein said predetermined frequency characteristic is a reciprocal of a function approximate to a frequency characteristic of an image defined by the shape of each of said light output opening.

5. The printer as claimed in claim 1,
wherein said storage means is capable of storing a plurality of first image data each of which corresponds to one printing line image; and
said reading means read out one of said first image data at one time.

6. In a printer for converting an electric image signal into a light image signal using light emitting means comprising plural emitting devices aligned in a main scan direction, each device having a light output opening elongated in a subscan direction perpendicular to the main scan direction, and for projecting said light image signal onto a photoconductive body so as to form an image thereof,
a method for processing an image signal comprising steps of:
Fourier transforming a primary electric image signal;
multiplying the value obtained by Fourier transforming by a predetermined frequency characteristic defined by the shape of each of said light output opening;
generating a secondary electric image signal by Fourier inverse transforming said obtained product; and
converting said secondary electric image signal into a light image signal using said light emitting means so as to form an image of said light image signal on said photoconductive body, thereby improving a deterioration of the quality of said printed image caused when said light output opening is used.

7. The method as claimed in claim 6,
wherein said predetermined frequency characteristic is a reciprocal of a frequency characteristic of an image defined by the shape of each of said light output opening.

8. The method as claimed in claim 6,
wherein said predetermined frequency characteristic is a reciprocal of a function approximate to a frequency characteristic of an image defined by the shape of each of said light output opening.

9. In a printer for converting an electric image signal into a light image signal using light emitting means comprising plural emitting devices aligned in a main scan direction, each device having a light output opening elongated in a subscan direction perpendicular to the main scan direction, and for projecting said light image signal onto a photoconductive body so as to form an image thereof,
a method for processing an image signal comprising:
a first step of storing a primary electric image signal corresponding to image of one page in a memory;
a second step of reading out a primary electric image signal by one printing line from said memory;
a third step of Fourier transforming said read primary electric image signal;
a fourth step of multiplying the value obtained by Fourier transforming by a predetermined frequency characteristic defined by the shape of each of said light output opening;
a fifth step of generating a secondary electric image signal by Fourier inverse transforming said obtained product;
a sixth step of converting said secondary electric image signal into a light image signal using said light emitting means so as to form an image of said light image signal on said photoconductive body; and
a seventh step of repeating said second to sixth steps so as to form said image of one page on said photoconductive body, thereby improving a deterioration of the quality of said printed image caused when said light output opening is used.

10. The method as claimed in claim 9,
wherein said predetermined frequency characteristic is a reciprocal of a frequency characteristic of an image defined by the shape of each of said light output opening.

11. The method as claimed in claim 9,
wherein said predetermined frequency characteristic is a reciprocal of a function approximate to a frequency characteristic of an image defined by the shape of each of said light output opening.

* * * * *